United States Patent
Song et al.

(10) Patent No.: US 12,246,566 B2
(45) Date of Patent: Mar. 11, 2025

(54) SUSPENSION FOR VEHICLE

(71) Applicant: HYUNDAI MOBIS Co., Ltd., Seoul (KR)

(72) Inventors: Woo Bin Song, Yongin-si (KR); Won Kil Moon, Yongin-si (KR)

(73) Assignee: Hyundai Mobis Co., Ltd., Seoul (KR)

( * ) Notice: Subject to any disclaimer, the term of this patent is extended or adjusted under 35 U.S.C. 154(b) by 332 days.

(21) Appl. No.: 17/856,642

(22) Filed: Jul. 1, 2022

(65) Prior Publication Data
US 2023/0008533 A1 Jan. 12, 2023

(30) Foreign Application Priority Data
Jul. 9, 2021 (KR) .................. 10-2021-0090335

(51) Int. Cl.
*B60G 11/02* (2006.01)
(52) U.S. Cl.
CPC .................. *B60G 11/02* (2013.01)
(58) Field of Classification Search
CPC ..... B60G 11/02; B60G 11/025; B60G 11/125; B60G 11/12; B60G 2202/11
See application file for complete search history.

(56) References Cited

U.S. PATENT DOCUMENTS

| | | | | |
|---|---|---|---|---|
| 2,072,156 | A * | 3/1937 | Cooke ................... | B60G 11/08 267/45 |
| 11,338,636 | B2 * | 5/2022 | Winter ................... | B60G 21/05 |
| 11,890,906 | B2 * | 2/2024 | Kim ....................... | F16F 1/3683 |
| 2014/0035250 | A1 * | 2/2014 | Dilworth ............... | B60G 11/04 280/124.111 |
| 2015/0091225 | A1 * | 4/2015 | Wilson ................... | C21D 9/02 148/575 |
| 2019/0126705 | A1 * | 5/2019 | Schramm .............. | F16F 1/3683 |
| 2019/0389266 | A1 * | 12/2019 | Oh ......................... | B60G 11/38 |
| 2021/0379948 | A1 * | 12/2021 | Rosenmeyer .......... | B60G 11/08 |
| 2023/0011251 | A1 * | 1/2023 | Kim ....................... | B60G 11/08 |
| 2023/0020086 | A1 * | 1/2023 | Song ...................... | B60G 11/08 |
| 2023/0356553 | A1 * | 11/2023 | Won ....................... | F16F 1/30 |
| 2023/0391155 | A1 * | 12/2023 | Song ...................... | B60G 11/10 |

FOREIGN PATENT DOCUMENTS

KR    10-2019-0016759 A    2/2019

\* cited by examiner

*Primary Examiner* — Brian L Swenson
(74) *Attorney, Agent, or Firm* — Morgan, Lewis & Bockius LLP

(57) ABSTRACT

A suspension for a vehicle may include: a center leaf spring; side leaf springs respectively installed on opposing sides of the center leaf spring; and mounting brackets configured to connect the center leaf spring and the side leaf springs, respectively, and to support the center leaf spring to be movable in a longitudinal direction.

10 Claims, 8 Drawing Sheets

SUSPENSION FOR VEHICLE

CROSS-REFERENCE TO RELATED APPLICATION

This application claims the benefit under 35 U.S.C. § 119(a) of priority to Korean Patent Application No. 10-2021-0090335 filed on Jul. 9, 2021 in the Korean Intellectual Property Office, the entire disclosure of which is incorporated herein by reference for all purposes.

BACKGROUND

Technical Field

Exemplary embodiments of the present disclosure relate to a suspension for a vehicle, and more particularly, to a suspension for a vehicle, which can prevent a displacement difference from occurring in the longitudinal direction of a leaf spring during driving.

Discussion of the Background

In general, a suspension for a vehicle connects an axle and a vehicle body, and absorbs and buffers shock or vibration applied to the axle from the road during driving, such that the shock or vibration is not directly transferred to the vehicle body, thereby improving ride comfort while preventing damage to the vehicle body and luggage.

In the related art, a member frame includes a leaf spring for supporting the weight of the vehicle with a multi-link suspension. This leaf spring may be buckled by a bump and rebound during driving. Therefore, a displacement occurs in the longitudinal direction of the leaf spring. Therefore, there is a need for a device capable of solving the problem.

The related art of the present disclosure is disclosed in Korean Patent Application Publication No. 10-2019-0016759 published on Feb. 19, 2019 and entitled "Suspension System for Vehicle with Composite Leaf Spring".

SUMMARY

Various embodiments are directed to a suspension for a vehicle, which can prevent a displacement difference from occurring in the longitudinal direction of a leaf spring during driving.

In an embodiment, a suspension for a vehicle may include: a center leaf spring; side leaf springs respectively installed on opposing sides of the center leaf spring; and mounting brackets configured to connect the center leaf spring and the side leaf springs, respectively, and to support the center leaf spring to be movable in a longitudinal direction.

Each of the mounting brackets may include: a mounting bracket accommodation part having a first side configured to accommodate the center leaf spring and a second side configured to accommodate one of the side leaf springs; and a deformable support part configured to connect the mounting bracket accommodation part and the center leaf spring, and to support the center leaf spring to be movable in the longitudinal direction, and the deformable support part may be made of an elastically deformable material.

The mounting bracket accommodation part may include: a mounting bracket accommodation body; a first mounting bracket accommodation part disposed on a first side of the mounting bracket accommodation body, configured to accommodate the center leaf spring, and connected to the deformable support part; and a second mounting bracket accommodation part disposed on a second side of the mounting bracket accommodation body, and configured to accommodate one of the side leaf springs.

The deformable support part may include: a deformable support body accommodated in the first mounting bracket accommodation part; and at least one deformable support coupler having a shape of "⌈⌉" in the deformable support body, and coupled to the mounting bracket accommodation part and/or the center leaf spring.

Each of the mounting brackets may further include at least one first mounting bracket connector disposed in the first mounting bracket accommodation part, and coupled to the deformable support part, and the at least one first mounting bracket connector may include: at least one first mounting bracket support part protruding toward the deformable support body; and at least one first mounting bracket coupler extending from an end of the at least one first mounting bracket support part, and coupled to the at least one deformable support coupler.

The at least one first mounting bracket coupler or the first mounting bracket accommodation part may have an etched inner surface.

The center leaf spring may include: at least one center support part protruding toward the deformable support body; and at least one center coupler extending from an end of the at least one center support part, and coupled to the at least one deformable support coupler.

The deformable support part may be cured and bonded to the center leaf spring.

The first mounting bracket accommodation part may have a space in which the center leaf spring is movable in the longitudinal direction.

Each of the mounting brackets may further include a bush mounted in the mounting bracket accommodation part, and made of an elastically deformable material.

The suspension for a vehicle in accordance with the present disclosure may perform correction according to a change in length of the center leaf spring in the side-to-side direction during driving, thereby preventing damage to the bottom of the vehicle.

Furthermore, in accordance with the present disclosure, the deformable support part may absorb the side-to-side sliding displacement of the center leaf spring.

Furthermore, in accordance with the present disclosure, the number of parts may be reduced to decrease the weight of a product, while the fuel efficiency of the vehicle is improved.

DETAILED DESCRIPTION OF THE ILLUSTRATED

Embodiments

Hereinafter, a suspension for a vehicle will be described below with reference to the accompanying drawings through various exemplary embodiments. It should be noted that the drawings are not to precise scale and may be exaggerated in thickness of lines or sizes of components for descriptive convenience and clarity only.

Furthermore, the terms as used herein are defined by taking functions of the invention into account and can be changed according to the custom or intention of users or operators. Therefore, definition of the terms should be made according to the overall disclosures set forth herein.

Figure 1:
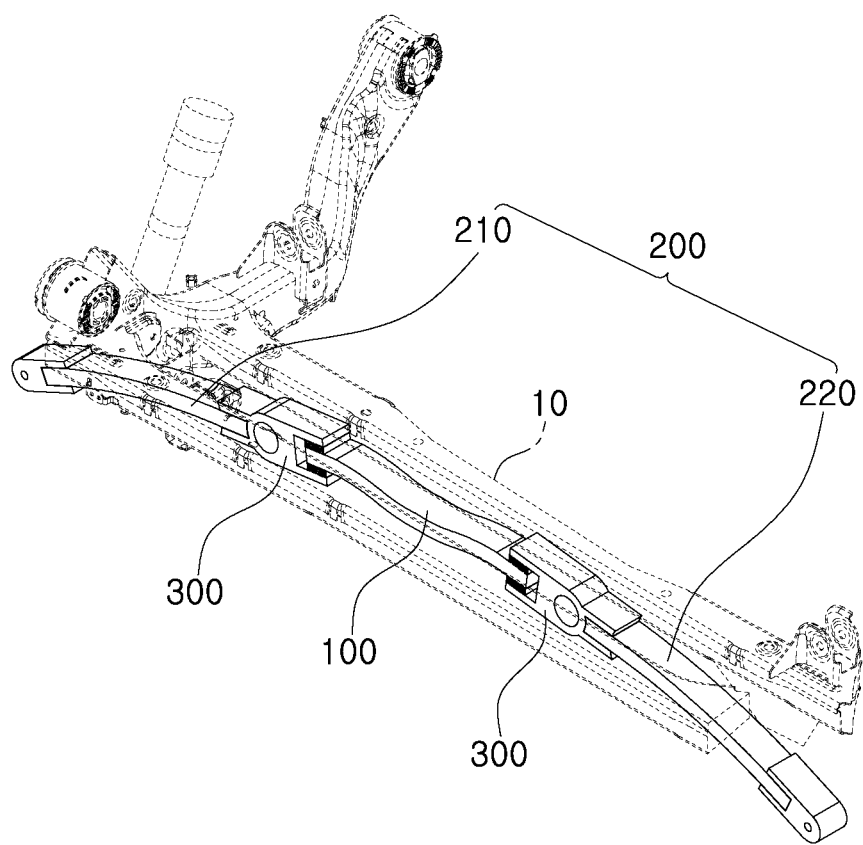
FIG. 1 is a perspective view schematically illustrating that a suspension for a vehicle in accordance with an embodiment of the present disclosure is mounted on a member frame.
Figure 2:
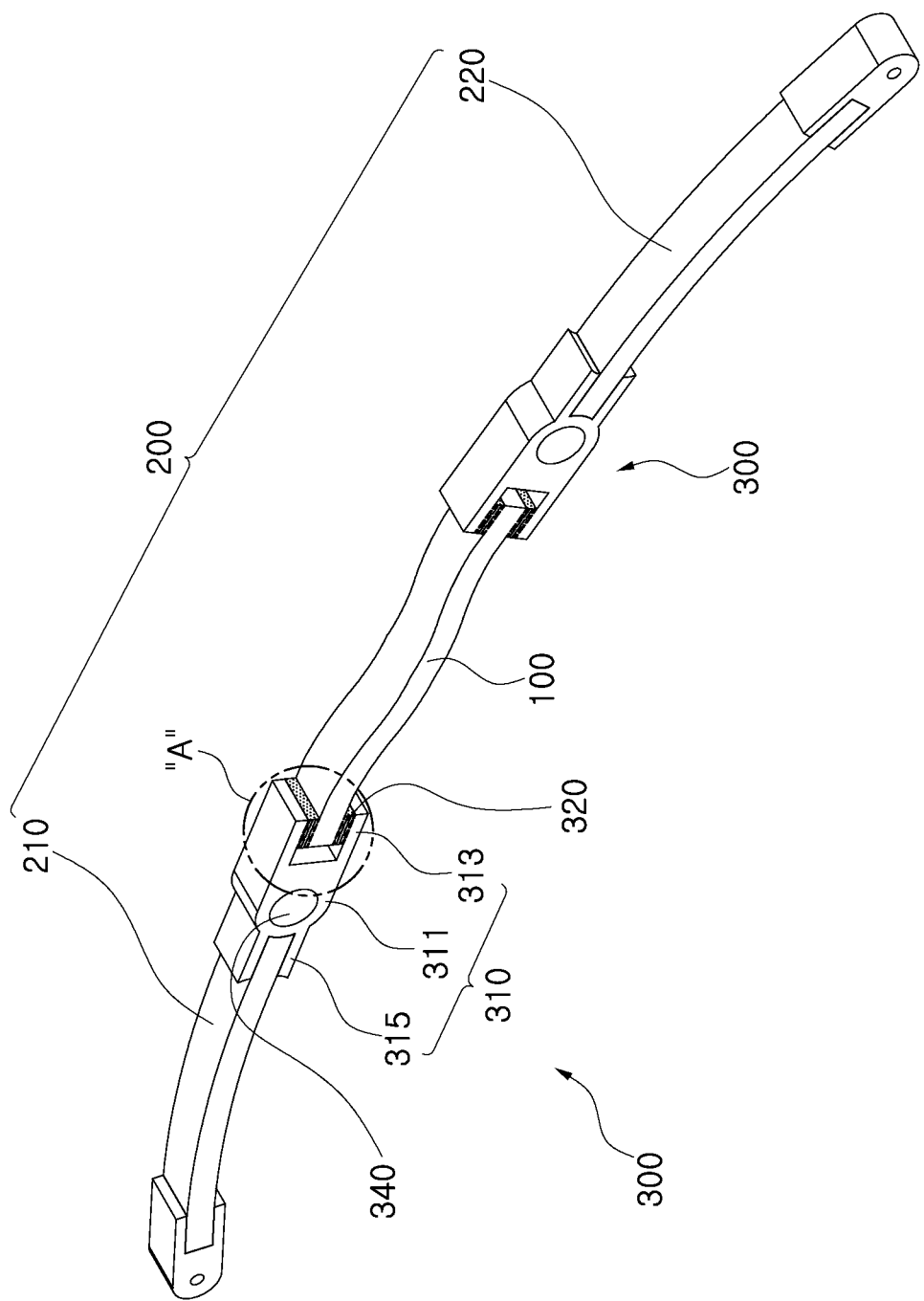
FIG. 2 is a perspective view schematically illustrating the suspension for a vehicle in accordance with the embodiment of the present disclosure.
Figure 3:
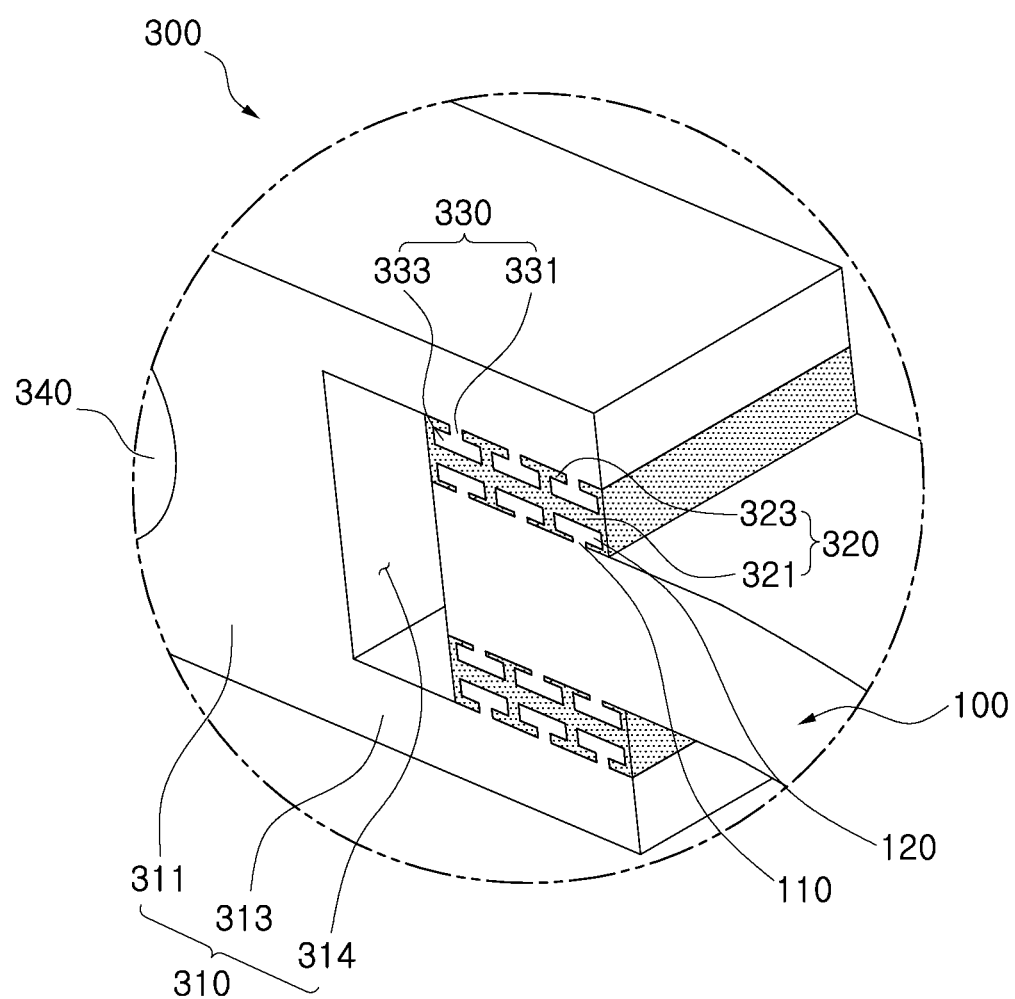
FIG. 3 is a partially expanded perspective view schematically illustrating a portion "A" of FIG. 2.
Figure 4:
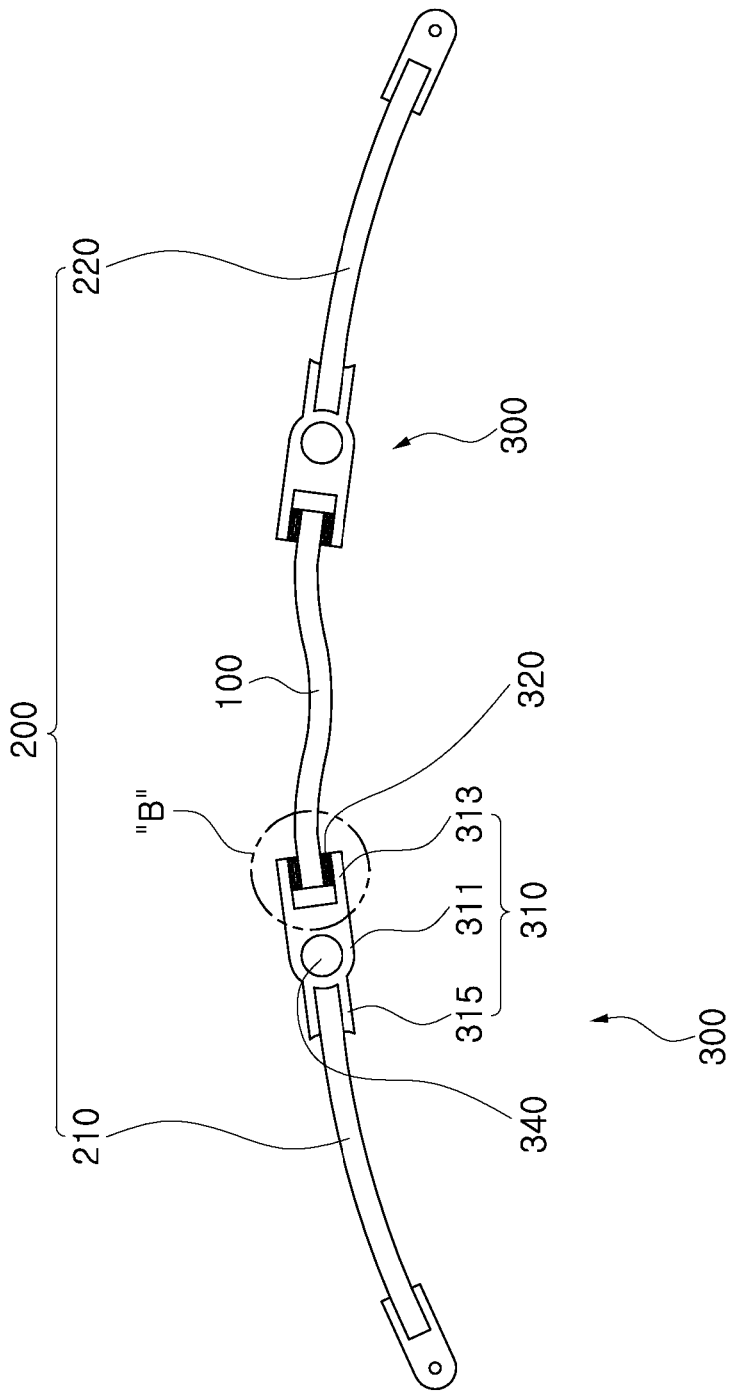
FIG. 4 is a front view schematically illustrating the suspension for a vehicle in accordance with the embodiment of the present disclosure.
Figure 5:
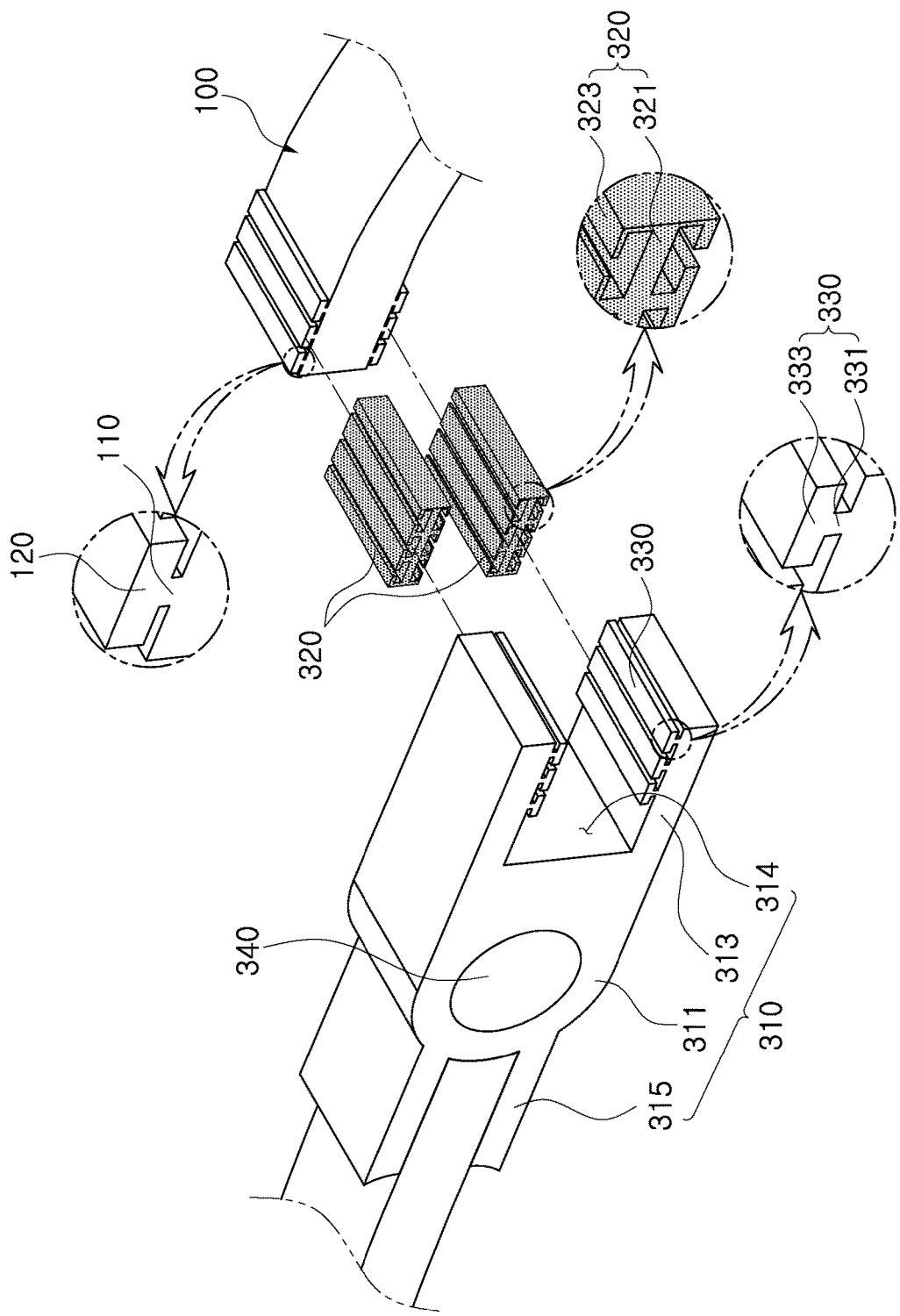
FIG. 5 is an assembled perspective view schematically illustrating main components of the suspension for a vehicle in accordance with the embodiment of the present disclosure.
Figure 6:
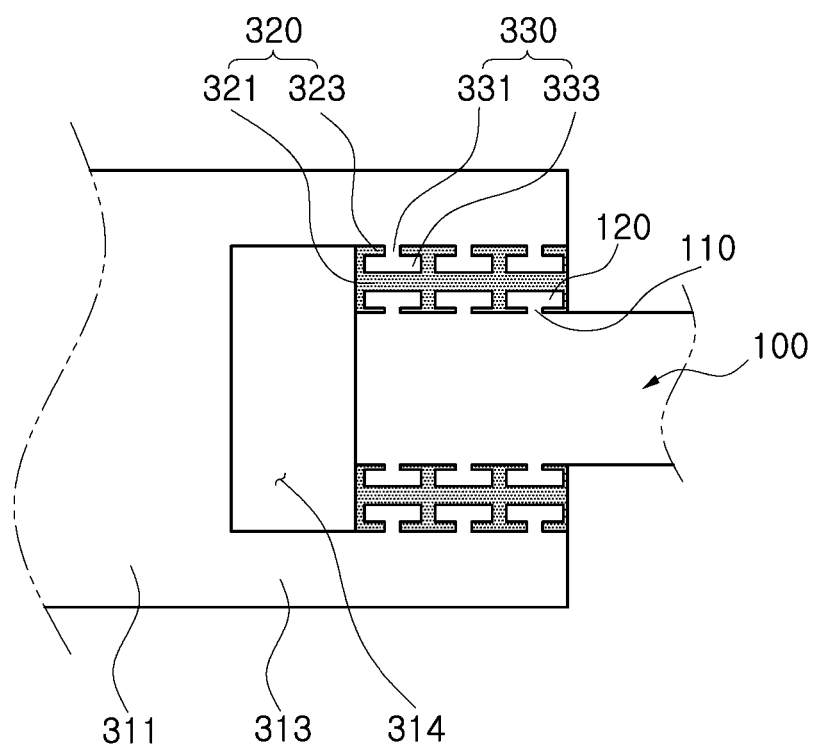
FIG. 6 is a front view schematically illustrating a coupling state between a center leaf spring and a mounting bracket in the suspension for a vehicle in accordance with the embodiment of the present disclosure.
Figure 7:
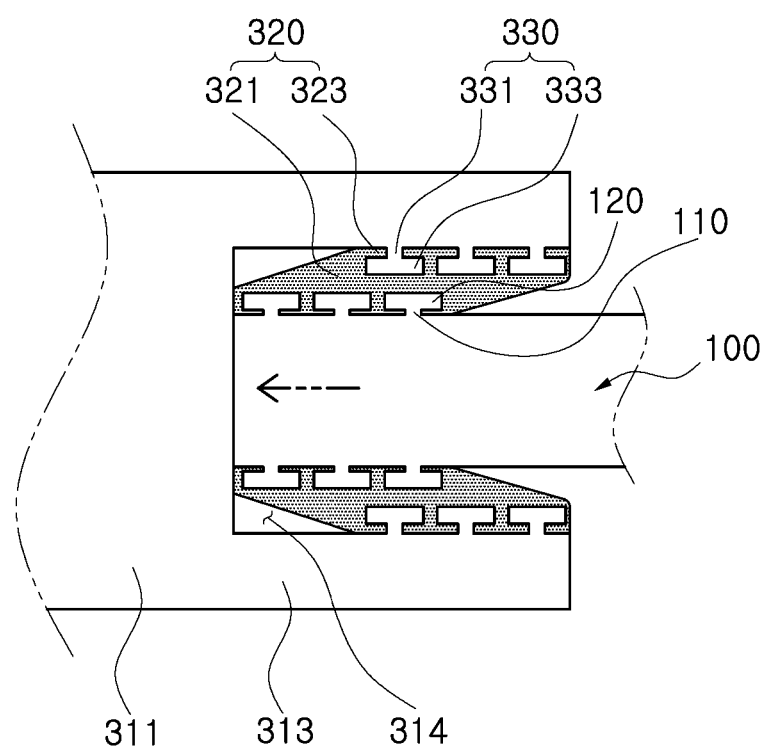
FIG. 7 is a front view schematically illustrating that the center leaf spring is extended from the mounting bracket in the suspension for a vehicle in accordance with the embodiment of the present disclosure.
Figure 8:
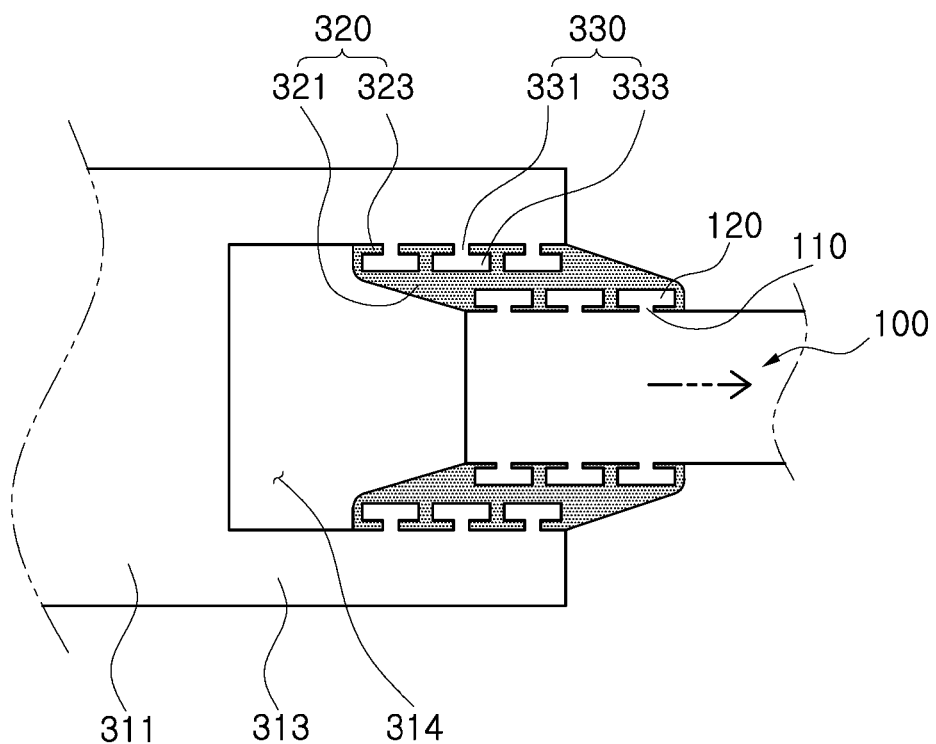
FIG. 8 is a front view schematically illustrating that the center leaf spring is compressed in the mounting bracket in the suspension for a vehicle in accordance with the embodiment of the present disclosure.

FIG. 1 is a perspective view schematically illustrating that a suspension for a vehicle in accordance with an embodiment of the present disclosure is mounted on a member frame, FIG. 2 is a perspective view schematically illustrating the suspension for a vehicle in accordance with the embodiment of the present disclosure, FIG. 3 is a partially expanded perspective view schematically illustrating a portion "A" of FIG. 2, FIG. 4 is a front view schematically illustrating the suspension for a vehicle in accordance with the embodiment of the present disclosure, FIG. 5 is an assembled perspective view schematically illustrating main components of the suspension for a vehicle in accordance with the embodiment of the present disclosure, FIG. 6 is a front view schematically illustrating a coupling state between a center leaf spring and a mounting bracket in the suspension for a vehicle in accordance with the embodiment of the present disclosure, FIG. 7 is a front view schematically illustrating that the center leaf spring is extended from the mounting bracket in the suspension for a vehicle in accordance with the embodiment of the present disclosure, and FIG. 8 is a front view schematically illustrating that the center leaf spring is compressed in the mounting bracket in the suspension for a vehicle in accordance with the embodiment of the present disclosure.

Referring to FIGS. 1 to 8, the suspension for a vehicle in accordance with the embodiment of the present disclosure includes a center leaf spring 100, a plurality of side leaf springs 200, and a plurality of mounting brackets 300. The suspension for a vehicle in accordance with the embodiment of the present disclosure is mounted on a member frame 10 disposed on a front wheel or rear wheel of the vehicle, and performs a damper function of absorbing shock of the vehicle.

The center leaf spring 100 may be made of an elastically deformable metallic material, and serve to absorb and reduce shock applied from the outside. The center leaf spring 100 may be formed in a curved shape.

The center leaf spring 100 is connected to the side leaf spring 200 through the mounting bracket 300. The center leaf spring 100 includes a center support part 110 and a center coupler 120 which are formed at either end thereof. The center leaf spring 100 may be slid from the mounting bracket 300 in a side-to-side direction (see FIG. 4).

The center support part 110 protrudes toward a deformable support body 321 of a deformable support part 320 of the mounting bracket 300. The center support part 110 vertically protrudes toward the deformable support body 321.

The center coupler 120 is formed at an end of the center support part 110, and coupled to a deformable support coupler 323 of the deformable support part 320 of the mounting bracket 300. The center coupler 120 has the same width as that of the deformable support coupler 323.

The side leaf spring 200 may be made of an elastically deformable metallic material, and serve to absorb and reduce shock applied from the outside. The side leaf spring 200 may be formed in a curved shape. The plurality of side leaf springs 200 are installed on either side of the center leaf spring 100. The side leaf spring 200 is connected to the center leaf spring 100 by the mounting bracket 300.

The side leaf spring 200 includes a first side leaf spring 210 installed on one side (left side in FIG. 4) of the center leaf spring 100 and a second side leaf spring 220 installed on the other side (right side in FIG. 4) of the center leaf spring 100. The first side leaf spring 210 and the second side leaf spring 220 are disposed on the left and right sides of the center leaf spring 100, respectively, and achieve the balance between the left and right sides of the center leaf spring 100.

The mounting bracket 300 serves to connect the center leaf spring 100 and the side leaf spring 200, and to support the center leaf spring 100 to be movable in the longitudinal direction (side-to-side direction in FIG. 4).

The mounting bracket 300 may support the center leaf spring 100 to be movable in the longitudinal direction of the center leaf spring 100, thereby preventing the center leaf spring 100 from drooping in the top-to-bottom direction.

The mounting bracket 300 includes a mounting bracket accommodation part 310 and the deformable support part 320. The mounting bracket accommodation part 310 has one side (right side in FIG. 5) configured to accommodate an end portion (left end portion in FIG. 5) of the center leaf spring 100 and the other side (left side in FIG. 5) configured to accommodate an end portion (right end portion in FIG. 5) of the side leaf spring 200.

The mounting bracket accommodation part 310 includes a mounting bracket accommodation body 311, a first mounting bracket accommodation part 313, and a second mounting bracket accommodation part 315. The first mounting bracket accommodation part 313 is formed so as to be open on one side (right side in FIG. 5) of the mounting bracket accommodation body 311, and the second mounting bracket accommodation part 315 is formed so as to be open on the other side (left side in FIG. 5) of the mounting bracket accommodation body 311.

The first mounting bracket accommodation part 313 is formed in a U-shape with an opening on one side (right side in FIG. 5) of the mounting bracket accommodation body 311, serves to accommodate the end portion of the center leaf spring 100, and is connected to the deformable support part 320. The first mounting bracket accommodation part 313 may be connected to the deformable support part 320 through a first mounting bracket connector 330.

The second mounting bracket accommodation part 315 is formed in a U-shape with an opening on the other side (right side in FIG. 5) of the mounting bracket accommodation body 311, and serves to accommodate the end portion of the side leaf spring 200. The second mounting bracket accommodation part 315 is connected to the end portion of the side leaf spring 200 through bolting, welding, bonding or the like.

In the present disclosure, the first mounting bracket accommodation part 313 of the mounting bracket accommodation part 310 includes a space 314 in which the center leaf spring 100 is movable in the longitudinal direction. In other words, the first mounting bracket accommodation part 313 has the space 314 in which the center leaf spring 100 can be moved in the longitudinal direction (side-to-side direction in FIG. 6).

The deformable support part 320 serves to connect the mounting bracket accommodation part 310 and the center leaf spring 100, and to support the center leaf spring 100 to be movable in the longitudinal direction. The deformable support part 320 is made of an elastically deformable material. The deformable support part 320 may be made of an elastically deformable material to support the center leaf spring 100 which is slid from side to side. In the present disclosure, the deformable support part 320 may be made of an elastically deformable material such as rubber or silicone. The deformable support part 320 is provided as a pair of deformable support parts accommodated in the first mounting bracket accommodation part 313.

The deformable support part 320 includes the deformable support body 321 and the deformable support coupler 323. The deformable support body 321 is accommodated in the first mounting bracket accommodation part 313. The deformable support coupler 323 is formed in the shape of "[]" in the deformable support body 321, and coupled to the mounting bracket accommodation part 310 or the center leaf spring 100.

In the present disclosure, the mounting bracket 300 further includes the first mounting bracket connector 330. The first mounting bracket connector 330 is formed in the first mounting bracket accommodation part 313, and coupled to the deformable support part 320.

The first mounting bracket connector 330 includes a first mounting bracket support part 331 and a first mounting bracket coupler 333. The first mounting bracket support part 331 vertically protrudes toward the deformable support body 321.

The first mounting bracket coupler 333 is formed at an end portion of the first mounting bracket support part 331, and coupled to the deformable support coupler 323. The first mounting bracket coupler 333 has the same width as that of the deformable support coupler 323.

The inner surface of the first mounting bracket coupler 333 or the first mounting bracket accommodation part 313 is etched. The inner surface of the first mounting bracket coupler 333 or the first mounting bracket accommodation part 313 is etched so that the roughness thereof is increased. As the roughness of the inner surface of the first mounting bracket coupler 333 or the first mounting bracket accommodation part 313 is increased, the friction with the first mounting bracket coupler 333 of the first mounting bracket connector 330 may be increased to prevent the separation.

The deformable support part 320 is cured and bonded to the center leaf spring 100. The deformable support part 320 is made of an elastic material such as rubber, and coupled to the center leaf spring 100 through a crosslink structure. During the curing bonding, sulfur is additionally coupled to an unsaturated portion having a rubber chain structure, and injected molding is performed.

In the present disclosure, the mounting bracket 300 further includes a bush 340. The bush 340 is mounted in the mounting bracket accommodation part 310, and made of an elastically deformable material. The bush 340 is formed in a cylindrical shape, and inserted into the mounting bracket accommodation body 311 of the mounting bracket accommodation part 310. The bush 340 may be inserted into the mounting bracket accommodation body 311 of the mounting bracket accommodation part 310, absorb external shock, and prevent the deformation of the mounting bracket accommodation body 311 of the mounting bracket accommodation part 310.

Referring to FIGS. 6 and 7, the movement of the center leaf spring 100 in the longitudinal direction in the suspension for a vehicle in accordance with the embodiment of the present disclosure will be described.

FIG. 6 illustrates that the center leaf spring 100 is not moved in the first mounting bracket accommodation part 313 of the mounting bracket accommodation part 310.

FIG. 7 illustrates that the center leaf spring 100 is extended and moved toward the space 314 of the first mounting bracket accommodation part 313.

FIG. 8 illustrates that the center leaf spring 100 is compressed and moved in a direction away from the space 314 of the first mounting bracket accommodation part 313.

The deformable support part 320 cured and coupled to the center leaf spring 100 may support the center leaf spring 100, and the center leaf spring 100 may be moved from side to side in the space 314 of the first mounting bracket accommodation part 313, which makes it possible to prevent the concentration of stress on the center leaf spring 100 caused by excessive deformation.

The suspension for a vehicle in accordance with the present disclosure may perform correction according to a change in length of the center leaf spring 100 in the side-to-side direction during driving, thereby preventing damage to the bottom of the vehicle.

Furthermore, in accordance with the present disclosure, the deformable support part 320 may absorb the side-to-side sliding displacement of the center leaf spring 100.

Furthermore, in accordance with the present disclosure, the number of parts may be reduced to decrease the weight of a product, while the fuel efficiency of the vehicle is improved.

Although exemplary embodiments of the disclosure have been disclosed for illustrative purposes, those skilled in the art will appreciate that various modifications, additions and substitutions are possible, without departing from the scope and spirit of the disclosure as defined in the accompanying claims. Thus, the true technical scope of the disclosure should be defined by the following claims.

What is claimed is:

1. A suspension for a vehicle, comprising:
a center leaf spring;
side leaf springs respectively installed on opposing sides of the center leaf spring; and
mounting brackets configured to connect the center leaf spring and the side leaf springs, respectively, and to support the center leaf spring to be movable in a longitudinal direction.

2. The suspension of claim 1, wherein each of the mounting brackets comprises:
a mounting bracket accommodation part having a first side configured to accommodate the center leaf spring and a second side configured to accommodate one of the side leaf springs; and a deformable support part configured to connect the mounting bracket accommodation part and the center leaf spring, and to support the center leaf spring to be movable in the longitudinal direction, the deformable support part being made of an elastically deformable material.

3. The suspension of claim 2, wherein the mounting bracket accommodation part comprises:

a mounting bracket accommodation body;

a first mounting bracket accommodation part disposed on a first side of the mounting bracket accommodation body, configured to accommodate the center leaf spring, and connected to the deformable support part; and a second mounting bracket accommodation part disposed on a second side of the mounting bracket accommodation body, and configured to accommodate one of the side leaf springs.

4. The suspension of claim 3, wherein the deformable support part comprises:

a deformable support body accommodated in the first mounting bracket accommodation part; and at least one deformable support coupler having a shape of "⊓" in the deformable support body, and coupled to the mounting bracket accommodation part and/or the center leaf spring.

5. The suspension of claim 4, wherein each of the mounting brackets further comprises at least one first mounting bracket connector disposed in the first mounting bracket accommodation part, and coupled to the deformable support part, wherein the at least one first mounting bracket connector comprises:

at least one first mounting bracket support part protruding toward the deformable support body; and at least one first mounting bracket coupler extending from an end of the at least one first mounting bracket support part, and coupled to the at least one deformable support coupler.

6. The suspension of claim 5, wherein the at least one first mounting bracket coupler or the first mounting bracket accommodation part has an etched inner surface.

7. The suspension of claim 4, wherein the center leaf spring comprises:

at least one center support part protruding toward the deformable support body; and at least one center coupler extending from an end of the at least one center support part, and coupled to the at least one deformable support coupler.

8. The suspension of claim 4, wherein the deformable support part is cured and bonded to the center leaf spring.

9. The suspension of claim 3, wherein the first mounting bracket accommodation part has a space in which the center leaf spring is movable in the longitudinal direction.

10. The suspension of claim 3, wherein each of the mounting brackets further comprises a bush mounted in the mounting bracket accommodation part, and made of an elastically deformable material.

* * * * *